US011818672B2

United States Patent
Khoryaev et al.

(10) Patent No.: US 11,818,672 B2
(45) Date of Patent: Nov. 14, 2023

(54) IN-DEVICE COORDINATION OF SIDELINK OVER LTE AND NR PC5 INTERFACES

(71) Applicant: Apple Inc., Cupertino, CA (US)

(72) Inventors: Alexey Khoryaev, Nizhny Novgorod (RU); Ansab Ali, Hillsboro, OR (US); Kyeongin Jeong, Youngin-si (KR); Mikhail Shilov, Nizhny Novgorod (RU); Sergey Panteleev, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 140 days.

(21) Appl. No.: 17/258,994

(22) PCT Filed: Aug. 8, 2019

(86) PCT No.: PCT/US2019/045766
§ 371 (c)(1),
(2) Date: Jan. 8, 2021

(87) PCT Pub. No.: WO2020/033735
PCT Pub. Date: Feb. 13, 2020

(65) Prior Publication Data
US 2021/0274452 A1 Sep. 2, 2021

Related U.S. Application Data

(60) Provisional application No. 62/717,562, filed on Aug. 10, 2018.

(51) Int. Cl.
*H04W 56/00* (2009.01)
*H04W 84/04* (2009.01)
(Continued)

(52) U.S. Cl.
CPC ....... *H04W 56/001* (2013.01); *H04W 72/569* (2023.01); *H04W 84/047* (2013.01); *H04W 88/04* (2013.01); *H04W 92/18* (2013.01)

(58) Field of Classification Search
None
See application file for complete search history.

(56) References Cited

U.S. PATENT DOCUMENTS

| 2018/0020459 A1 | 1/2018 | Chatterjee et al. |
| 2018/0035416 A1 | 2/2018 | Yi et al. |

(Continued)

FOREIGN PATENT DOCUMENTS

KR 10-2018-0021867 A 3/2018

OTHER PUBLICATIONS

International Search Report and Written Opinion for International Application No. PCT/US2019/045766, dated Jan. 29, 2020, 9 pgs.
(Continued)

*Primary Examiner* — Hong Shao
(74) *Attorney, Agent, or Firm* — Kowert, Hood, Munyon, Rankin & Goetzel, P.C.

(57) ABSTRACT

Embodiments of a User Equipment (UE), Next Generation Node-B (gNB), Evolved Node-B (eNB) and methods of communication are generally described herein. The UE may determine, based on one or more detected synchronization signals, a reference timing to be used for a common synchronization of Long Term Evolution (LTE) sidelink communication on an LTE PC5 interface and New Radio (NR) sidelink communication on an NR PC5 interface in accordance with time division multiplexing (TDM) operation, wherein subframe boundaries of the LTE PC5 interface and the NR PC5 interface are aligned in time. If the UE detects, during a time period, an in-device conflict between a service configured for the LTE PC5 interface and a service configured for the NR PC5 interface, the UE may determine which of the services to support during the time period based on corresponding priorities.

20 Claims, 4 Drawing Sheets

(51) Int. Cl.
*H04W 88/04* (2009.01)
*H04W 72/12* (2023.01)
*H04W 72/566* (2023.01)
*H04W 92/18* (2009.01)

(56) References Cited

U.S. PATENT DOCUMENTS

2018/0115930 A1 4/2018 Belleschi et al.
2019/0274121 A1* 9/2019 Wu ..................... H04W 72/042
2019/0296881 A1* 9/2019 Ang ..................... H04W 52/32

OTHER PUBLICATIONS

Intel Corporation, 'Synchronization Aspects for LTE V2V Sidelink Carrier Aggregation', RI-1712482, 3GPP TSG RAN WG1 Meeting #90, Prague, Czech, Aug. 12, 2017.

* cited by examiner

IN-DEVICE COORDINATION OF SIDELINK OVER LTE AND NR PC5 INTERFACES

PRIORITY CLAIM

This application claims the benefit of priority to U.S. Provisional Patent Application Ser. No. 62/717,562, filed Aug. 10, 2018, which is incorporated herein by reference in its entirety.

TECHNICAL FIELD

Embodiments pertain to wireless communications. Some embodiments relate to wireless networks including 3GPP (Third Generation Partnership Project) networks, and 3GPP LTE (Long Term Evolution) networks, Fifth Generation (5G) networks, and/or New Radio (NR) networks. Some embodiments relate to sidelink communication, vehicle-to-vehicle (V2V) communication and/or vehicle-to-everything (V2X) communication. Some embodiments relate to methods of in-device coordination of sidelink communication over an LTE PC5 interface and an NR PC5 interface to ensure seamless co-existence of both interfaces in a single device.

BACKGROUND

Efficient use of the resources of a wireless network is important to provide bandwidth and acceptable response times to the users of the wireless network. However, often there are many devices trying to share the same resources and some devices may be limited by the communication protocol they use or by their hardware bandwidth. Moreover, wireless devices may need to operate with both newer protocols and with legacy device protocols.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
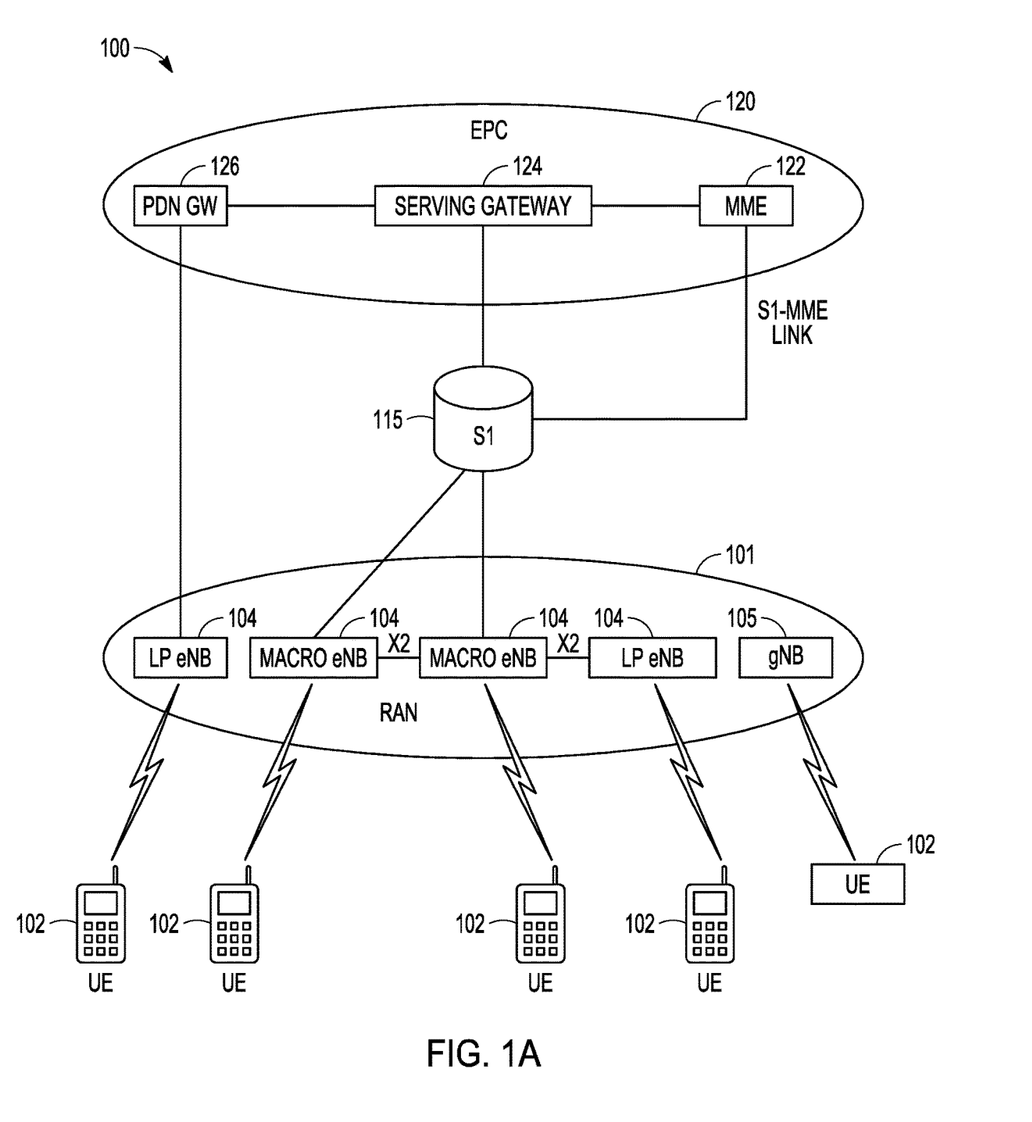
FIG. 1A is a functional diagram of an example network in accordance with some embodiments.
Figure 1B:
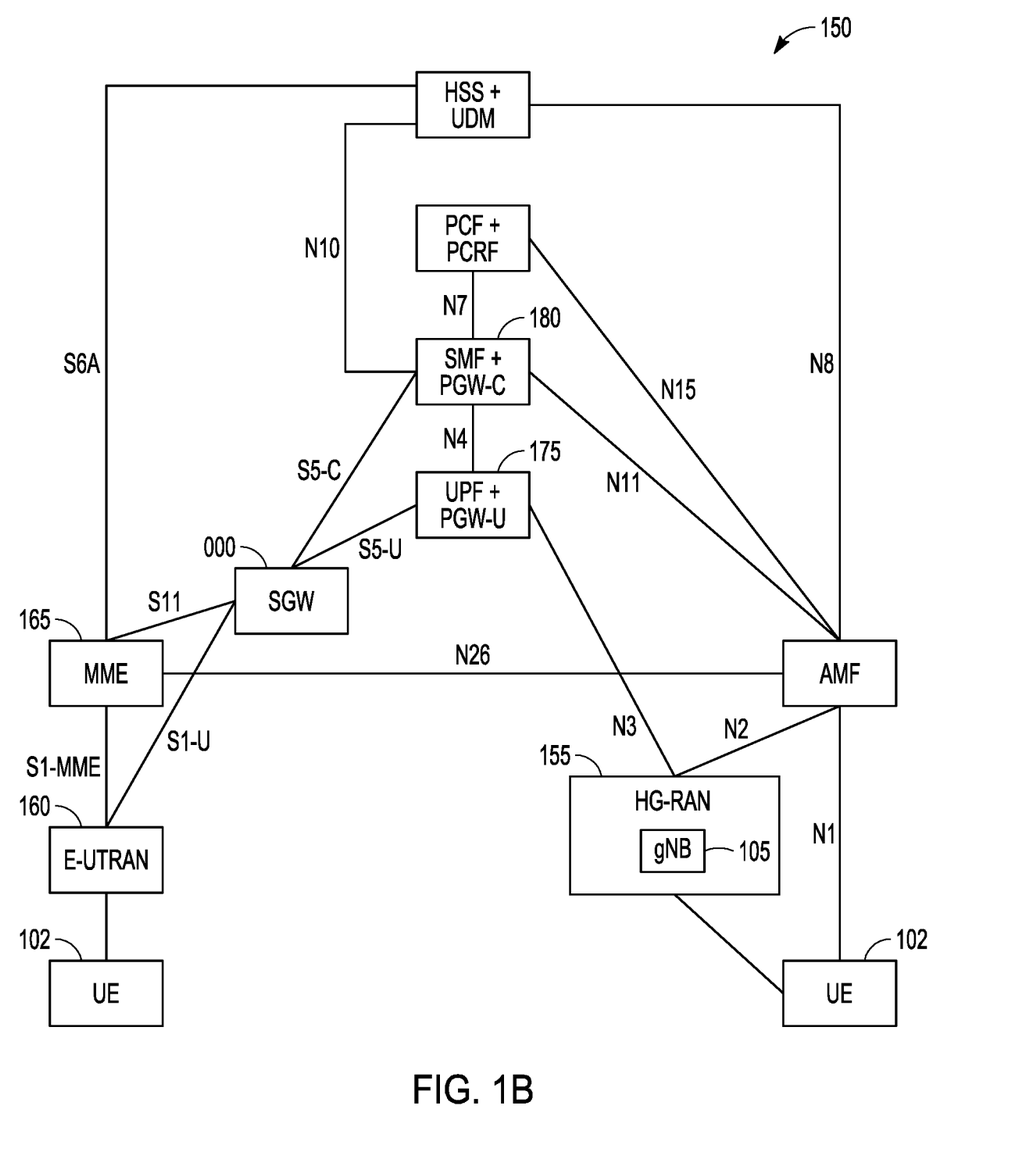
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network, a new radio (NR) network and/or Fifth Generation (5G) network. Other networks may be used in some embodiments. In some embodiments, a network may include one or more of: one or more components shown in FIG. 1A; one or more components shown in FIG. 1B; and one or more additional components. Some embodiments may not necessarily include all components shown in FIG. 1A and FIG. 1B.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In some embodiments, the RAN 101 may include one or more of: one or more components of an evolved universal terrestrial radio access network (E-UTRAN), one or more components of an NR network, and/or one or more other components.

The core network 120 may include a mobility management entity (MME) 122, a serving gateway (serving GW) 124, and packet data network gateway (PDN GW) 126. In some embodiments, the networks 100, 150 may include (and/or support) one or more Evolved Node-B's (eNBs) 104 and/or one or more Next Generation Node-B's (gNBs) 105. The eNBs 104 and/or gNBs 105 may operate as base stations for communicating with User Equipment (UE) 102. In some embodiments, one or more eNBs 104 may be configured to operate as gNBs 105. Embodiments are not limited to the number of eNBs 104 shown in FIG. 1A or to the number of gNBs 105 shown in FIG. 1B. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with one or more of: a 3GPP LTE protocol/standard, an NR protocol/standard, a Fifth Generation (5G) protocol/standard; and/or other protocol/standard, although the scope of embodiments is not limited in this respect.

Descriptions herein of one or more operations, techniques and/or methods practiced by a component (such as the UE 102, eNB 104, gNB 105 and/or other) are not limiting. In some embodiments, one or more of those operations, techniques and/or methods may be practiced by another component.

The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. The serving GW 124 and the MME 122 may be implemented in one physical node or separate physical nodes.

In some embodiments, UEs 102, the eNB 104 and/or gNB 105 may be configured to communicate Orthogonal Frequency Division Multiplexing (OFDM) communication signals over a multicarrier communication channel in accordance with an Orthogonal Frequency Division Multiple Access (OFDMA) communication technique.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165, which may be similar to the MME 122 described herein, although the scope of embodiments is not limited in this respect. In some embodiments, the network 150 may include the SGW 170, which may be similar to the SGW 124 described herein, although the scope of embodiments is not limited in this respect.

Embodiments are not limited to the number or type of components shown in FIG. 1B. Embodiments are also not limited to the connectivity of components shown in FIG. 1B.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
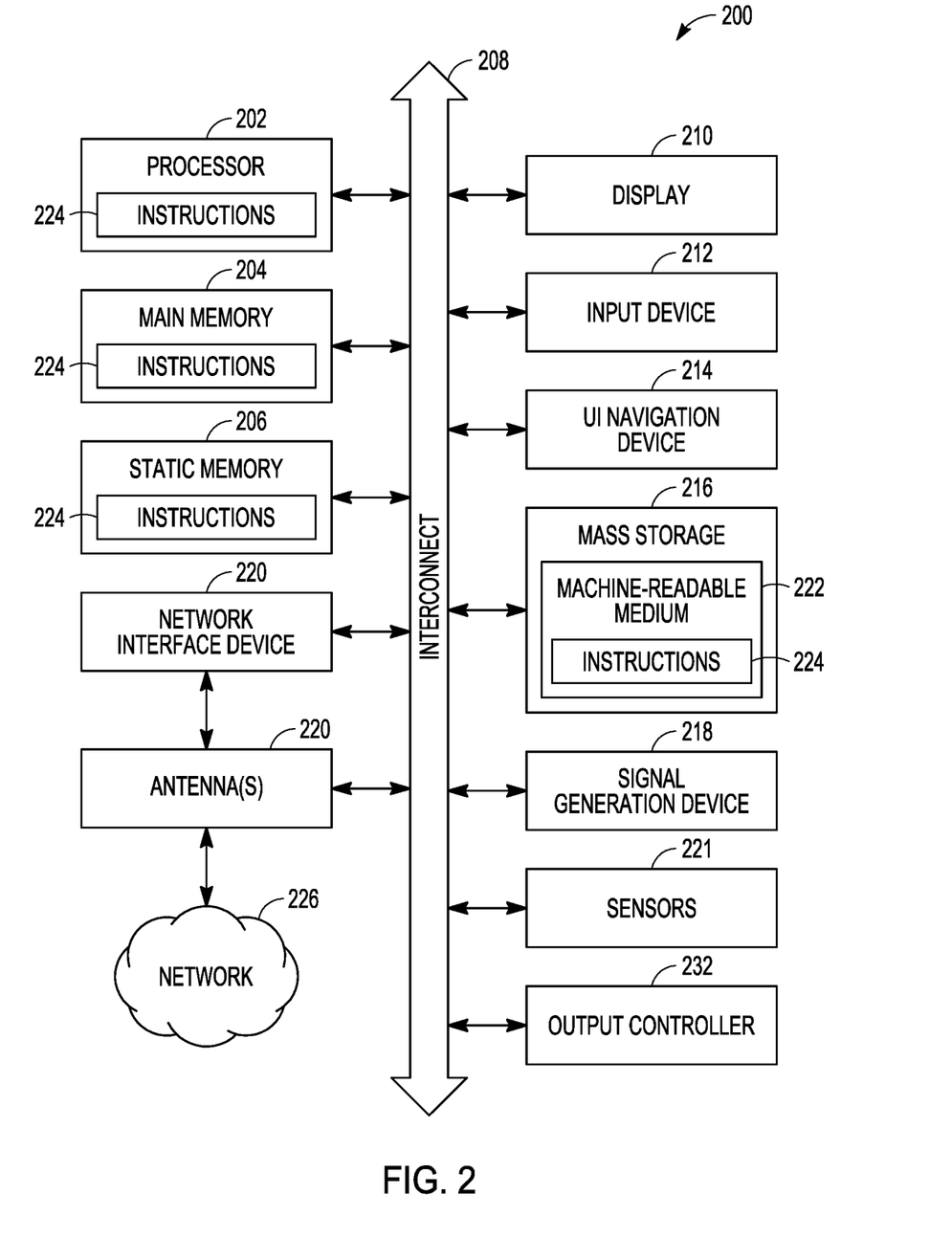
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. The machine 200 may be a UE 102, eNB 104, gNB 105, access point (AP), station (STA), user, device, mobile device, base station, another device, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include one or more of 210-228.

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
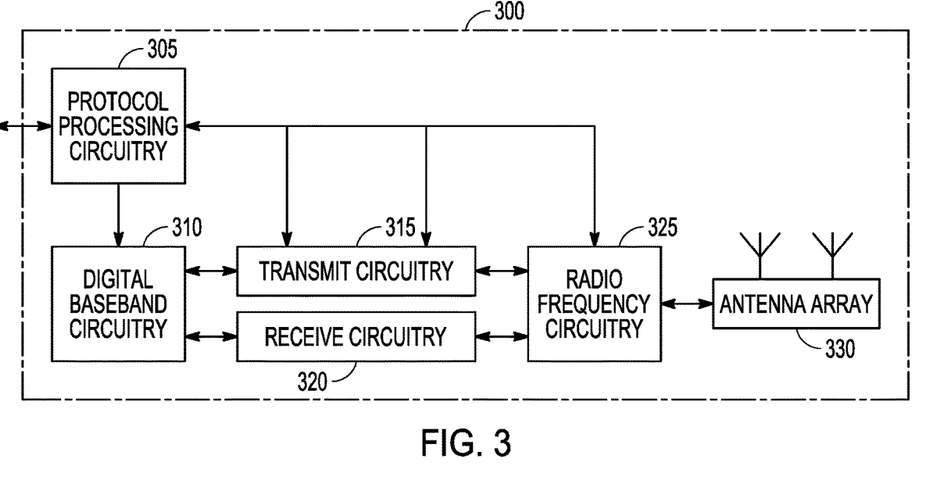
FIG. 3 illustrates an exemplary communication circuitry according to some aspects.

FIG. 3 illustrates an exemplary communication circuitry according to some aspects. It should be noted that a device, such as a UE 102, eNB 104, gNB 105, the machine 200 and/or other device may include one or more components of the communication circuitry 300, in some aspects. The communication circuitry 300 may include protocol processing circuitry 305, which may implement one or more of: medium access control (MAC), radio link control (RLC), packet data convergence protocol (PDCP), radio resource control (RRC) and non-access stratum (NAS) functions. The communication circuitry 300 may further include digital baseband circuitry 310, which may implement one or more physical layer (PHY) functions. The communication circuitry 300 may further include transmit circuitry 315, receive circuitry 320 and/or antenna array circuitry 330. The communication circuitry 300 may further include radio frequency (RF) circuitry 325. In an aspect of the disclosure, RF circuitry 325 may include multiple parallel RF chains for one or more of transmit or receive functions, each connected to one or more antennas of the antenna array 330.

In some embodiments, processing circuitry may perform one or more operations described herein and/or other operation(s). In a non-limiting example, the processing circuitry may include one or more components such as the processor 202, protocol processing circuitry 305, digital baseband circuitry 310, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as transmit circuitry 315, receive circuitry 320, radio frequency circuitry 325, similar component(s) and/or other component(s).

Although the UE 102, eNB 104, gNB 105, machine 200 and/or other device described herein may each be illustrated as having several separate functional elements, one or more of the functional elements may be combined and may be implemented by combinations of software-configured elements, such as processing elements including digital signal processors (DSPs), one or more microprocessors, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, machine 200, and/or other device may include various components shown in FIGS. 2-3 and/or other components. Accordingly, techniques and operations described herein that are performed by a device may be performed by an apparatus of the device, in some embodiments.

In accordance with some embodiments, the UE 102 may detect one or more synchronization signals for sidelink synchronization. The UE 102 may, based on the one or more synchronization signals, determine a reference timing to be used for a common synchronization of Long Term Evolution (LTE) sidelink communication on an LTE PC5 interface and New Radio (NR) sidelink communication on an NR PC5 interface in accordance with time division multiplexing (TDM) operation, wherein subframe boundaries of the LTE PC5 interface and the NR PC5 interface are aligned in time. The UE 102 may receive, from an eNB 104 of an LTE network or a gNB 105 of an NR network, information related to priorities of: one or more services configured for the LTE PC5 interface, and one or more services configured for the NR PC5 interface. If the UE 102 detects, during a time period, an in-device conflict between a service configured for the LTE PC5 interface and a service configured for the NR PC5 interface, the UE 102 may determine which of the services to support during the time period based on the corresponding priorities. These embodiments are described in more detail below.

Figure 4:
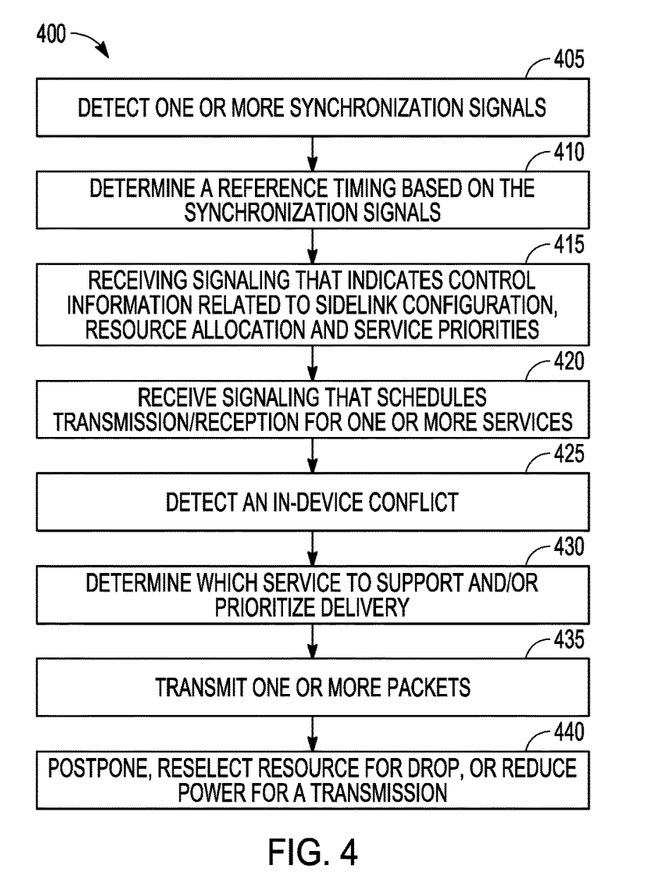
FIG. 4 illustrates the operation of a method of communication in accordance with some embodiments.

FIG. 4 illustrates the operation of a method of communication in accordance with some embodiments. Embodiments of the method 400 may include additional or even fewer operations or processes in comparison to what is illustrated in FIG. 4. Embodiments of the method 400 are not necessarily limited to the chronological order that is shown in FIG. 4.

In some embodiments, a UE 102 may perform one or more operations of the method 400, but embodiments are not limited to performance of the method 400 and/or operations of it by the UE 102. In some embodiments, a device and/or component (including but not limited to the UE 102, gNB 105 and/or eNB 104) may perform one or more operations that may be the same as, similar to, reciprocal to and/or related to an operation of the method 400.

Discussion of various operations, techniques and/or concepts regarding one method described herein (such the method 400 and/or other) may be applicable to another method described herein (such as the method 400 and/or other). One or more of the techniques, operations and/or methods described herein may be performed by a device other than an eNB 104, gNB 105, and UE 102, including but not limited to a Wi-Fi access point (AP), station (STA) and/or other.

In some embodiments, an apparatus of a device (including but not limited to the UE 102, eNB 104, gNB 105 and/or other) may comprise memory that is configurable to store one or more elements, and the apparatus may use them for performance of one or more operations. The apparatus may include processing circuitry, which may perform one or more operations (including but not limited to operation(s) of the method 400 and/or other methods described herein). The processing circuitry may include a baseband processor. The baseband circuitry and/or the processing circuitry may perform one or more operations described herein. The apparatus may include a transceiver to transmit and/or receive one or more blocks, messages and/or other elements.

Embodiments are not limited by references herein to transmission, reception and/or exchanging of elements such as frames, messages, requests, indicators, signals or other elements. In some embodiments, such an element may be generated, encoded or otherwise processed by processing circuitry for transmission by a transceiver or other component cases. In some embodiments, such an element may be received by a transceiver or other component, and may be decoded, detected or otherwise processed by processing circuitry. In some embodiments, the processing circuitry and the transceiver may be included in a same apparatus. In some embodiments, the transceiver may be separate from the apparatus that comprises the processing circuitry, in some embodiments.

One or more of the elements (such as messages, operations and/or other) described herein may be included in a 3GPP protocol, 3GPP LTE protocol, 4G protocol, 5G protocol, NR protocol and/or other protocol, but embodiments are not limited to usage of those elements. In some embodiments, other elements may be used, including other element(s) in a same standard/protocol, other element(s) in another standard/protocol and/or other. In addition, the scope of embodiments is not limited to usage of elements that are included in standards.

In some embodiments, the UE 102, eNB 104 and/or gNB 105 may be arranged to operate in accordance with a 3GPP protocol, NR protocol, and/or other protocol.

At operation 405, the UE 102 may detect one or more synchronization signals. At operation 410, the UE 102 may determine a reference timing based on the one or more synchronization signals. At operation 415, the UE 102 may receive signaling that indicates control information related to sidelink configuration, resource allocation and service priorities. At operation 420, the UE 102 may receive signaling that schedules transmission/reception for one or more services. At operation 425, the UE 102 may detect an in-device conflict. At operation 430, the UE 102 may determine which service to support and/or prioritize delivery. At operation 435, the UE 102 may transmit one or more packets. At operation 440, the UE 102 may postpone, reselect resource(s) for, drop, or reduce power for a transmission.

In some embodiments, the UE 102 may detect one or more synchronization signals. In some embodiments, the synchronization signals may include one or more of: an LTE synchronization signal from the eNB 104, an NR synchronization signal from the gNB 105, a sidelink synchronization signal (SLSS) from another UE 102, GNSS signals, and/or other.

In some embodiments, the UE 102 may determine a reference timing. In some embodiments, the UE 102 may determine the reference timing based on the one or more synchronization signals and/or other. In some embodiments, the UE 102 may determine the reference timing to be used for a common synchronization of Long Term Evolution (LTE) sidelink communication on an LTE PC5 interface and New Radio (NR) sidelink communication on an NR PC5 interface. In some embodiments, the LTE sidelink communication and the NR communication may be in accordance with time division multiplexing (TDM) operation although the scope of embodiments is not limited in this respect. In some embodiments, subframe boundaries of the LTE PC5 interface and the NR PC5 interface may be aligned in time.

In some embodiments, the UE 102 may receive, from an eNB 104 of an LTE network or a gNB 105 of an NR network, signaling that indicates control information. In some embodiments, control information may be exchanged between UE NR PC5 and LTE PC5 interfaces through in-device coordination function. In some embodiments, the control information may indicate sidelink resource allocation information for each PC5 interface and sidelink priorities of: one or more services configured for the LTE PC5 interface, and one or more services configured for the NR PC5 interface. In some embodiments, the control information may include additional information and/or other information.

In some embodiments, the UE 102 may detect an in-device conflict. In a non-limiting example, the UE 102 may detect an in-device conflict between a service configured for the LTE PC5 interface and a service configured for the NR PC5 interface. In some embodiments, the detected in-device conflict may occur during a time period (such as one or more subframes, slots or orthogonal frequency division multiplexing (OFDM) symbols, slots or subframes). References herein to "in-device conflicts" and operations related to the in-device conflicts are not limiting. In some embodiments, UE 102 may determine that a conflict occurs or would occur (such as a conflict between a transmission by the UE 102 and a reception by the UE 102, two transmissions by the UE 102, two receptions by the UE 102, and/or other), and may perform one or more of the operations described herein as a result. Such a conflict may not necessarily be an "in-device conflict," in some embodiments.

In some embodiments, if the UE 102 detects an in-device conflict (during a time period) between two services, the UE 102 may determine which of the services to support during the time period. In some embodiments, the UE 102 may determine which of the services to support based on the corresponding priorities and/or other information/parameters. In some embodiments, the UE 102 may prioritize transmissions of a service that the UE 102 has determined to support. One or more of the operations, techniques and/or methods described herein that are related to two services may be extended to more than two services, in some embodiments. For instance, the UE 102 may determine that a conflict between three or more transmissions/receptions occurs or would occur.

In some embodiments, if the in-device conflict is between a transmission on the NR PC5 interface for a first service, and a transmission on the LTE PC5 interface for a second service; and if a first priority of the first service and a second priority for the second service are available to the UE 102; and if the first and second priorities are different, the UE 102 may perform one or more of: select the service for which the corresponding priority is highest; prioritize transmission of the selected service; transmit one or more packets for transmission for the selected service on the corresponding PC5 interface; and/or other. In some embodiments, of the first and second services, for the service that is not selected, the UE 102 may perform one or more of: postpone the corresponding transmission; trigger resource reselection; determine non-conflicting resources for transmission; reselect resource for transmission; drop the corresponding transmission; reduce a transmit power of the corresponding transmission; and/or other.

In some embodiments, if either the first priority of the first service or the second priority for the second service is not available to the UE 102; or if the first and second priorities are available to the UE 102 and the first and second priorities are the same, the UE 102 may perform one or more of: select either the first service or the second service based on preconfigured information; prioritize transmission of the selected service; share transmit power for transmission on both interfaces (NR PC5 and LTE PC5); transmit one or more packets for the selected service on the corresponding PC5 interface; transmit one or more packets for delivery of the selected service on the corresponding PC5 interface; and/or other. In some embodiments, the preconfigured information may include a channel busy ratio of each of the PC5 interfaces and/or other.

In some embodiments, the UE 102 may perform one or more of: indicate, to the eNB 104 or the gNB 105, UE capability of in-device coordination on PC5 interfaces to mitigate potential conflicts between eNB 104 and gNB 105 implementation; receive first signaling that schedules the transmission on the NR PC5 interface for the first service; receive second signaling that schedules the transmission on the LTE PC5 interface for the second service; receive signaling that schedules either or both of the transmission on the NR PC5 interface for the first service and the transmission on the LTE PC5 interface for the second service; apply in-device coordination actions if it is detected that scheduled transmissions are in conflict; and/or other.

In some embodiments, if the in-device conflict is between the transmission on the NR PC5 interface for the first service, and reception on the LTE PC5 interface for the second service; or if the in-device conflict is between reception on the NR PC5 interface for the first service, and the transmission on the LTE PC5 interface for the second service: the UE 102 may select the service for which the corresponding priority is highest. In some embodiments, the UE 102 may prioritize transmission of the selected service. In some embodiments, the UE 102 may re-select resources for service transmission if reception was prioritized; and/or drop transmission if reception of the service was prioritized.

In some embodiments, if the in-device conflict is between reception on the NR PC5 interface for the first service, and reception on the LTE PC5 interface for the second service; and if the processing circuitry is configured for shared processing of the reception on the NR PC5 interface and reception on the LTE PC5 interface, the UE 102 may perform one or more of: select the service for which the corresponding priority is highest; prioritize reception of the selected service; receive one or more packets for the selected service on the corresponding PC5 interface; refrain from reception for the service, of the first and second services, that is not selected; refrain from reception for the service, of the first and second services, that is not selected if reception of both services is not feasible and/or if it is determined that reception of both services is not feasible; and/or other.

In some embodiments, if the in-device conflict is between reception on the NR PC5 interface for the first service, and reception on the LTE PC5 interface for the second service; and if the processing circuitry is not configured for shared processing of the reception on the NR PC5 interface and reception on the LTE PC5 interface, the UE 102 may perform one or more of: receive one or more packets for the first service on the NR PC5 interface; receive one or more packets for the second service on the LTE PC5 interface; and/or other.

In some embodiments, the common synchronization may be further in accordance with an alignment of system frame numbers (SFNs) and direct frame numbers (DFNs) for the LTE sidelink communication on the LTE PC5 interface and NR sidelink communication on the NR PC5 interface. In some embodiments, the common synchronization may be further in accordance with an alignment of SFNs and/or direct frame numbers (DFNs).

In some embodiments, the in-device conflict may be based on one or more of: leakage from a transmission for one of the services that affects transmission or reception for the other service; whether the UE 102 is capable of simultaneous transmission for one of the services and reception for the other service or simultaneous transmission or reception of both services; and/or other.

In some embodiments, the common synchronization may be further in accordance with a time alignment of resource grids for the LTE sidelink communication on the LTE PC5 interface and NR sidelink communication on the NR PC5 interface.

In some embodiments, the UE 102 may receive, from the eNB 104 or gNB 105 or UE LTE PC5 or UE NR PC5 interface, additional signaling that includes one or more of: sidelink resource allocation and radio-layer configuration settings, radio-layer conditions and measurements for the NR PC5 interface or the LTE PC5 interface, status information related to a delivered service on the NR PC5 interface or the LTE PC5 interface, and/or other. In some embodiments, the UE 102 may determine which of the services to support during the time period based at least partly on the information included in the additional signaling. It should be noted that the additional signaling may not necessarily be received from just one of the eNB 104 and the gNB 105. In some embodiments, the UE 102 may receive additional signaling from the eNB 104 that includes some or all of the above information, and the UE 102 may also receive additional signaling from the gNB 105 that includes some or all of the above information.

In some embodiments, the UE 102 may receive from the eNB 104 or gNB 105 or UE LTE PC5 or UE NR PC5 interface, additional signaling that includes inter radio access technology (inter-RAT) assistance information, including information related to one or more of: sidelink resource configurations, sidelink synchronization, reserved sidelink resources, reserved time intervals, active resource reservation processes, semi-persistent processes, active hybrid automatic repeat request (HARQ) processes, active resource reservations and semi-persistent resource allocation, active HARQ processes with resource reservations, delivered service priority and resources selected for delivery (either transmission or reception), and/or other. The UE 102 may determine which of the services to support during the time period based at least partly on the information included in the additional signaling. It should be noted that the additional signaling may not necessarily be received from just one of the eNB 104 and the gNB 105. In some embodiments, the additional signaling may be exchanged between UE NR PC5 and UE LTE PC5 interfaces through in-device coordination function. In some embodiments, the UE 102 may receive additional signaling from the eNB 104 that includes some or all of the above information, and the UE 102 may also receive additional signaling from the gNB 105 that includes some or all of the above information.

In some embodiments, the UE 102 may receive, from an eNB 104 of an LTE network or a gNB 105 of an NR network, signaling that configures the UE 102 for one or more services on an LTE PC5 interface and one or more services on an NR PC5 interface. In some embodiments, the signaling may further include information to configure the UE 102 to resolve in-device conflicts between communication on the LTE PC5 interface and communication on the NR PC5 interface. The information may include one or more of: priorities of the services, radio-layer conditions and measurements for the NR PC5 interface or the LTE PC5 interface, status information related to a service on the NR PC5 interface or the LTE PC5 interface, and/or other. It should be noted that the signaling may not necessarily be received from just one of the eNB 104 and the gNB 105. In some embodiments, listed above information may be shared with coordination function by UE LTE PC5 and UE NR PC5 interfaces to further control UE behavior on each interface. In some embodiments, the UE 102 may receive signaling from the eNB 104 that includes some or all of the above information, and the UE 102 may also receive signaling from the gNB 105 that includes some or all of the above information.

In some embodiments, if the UE 102 detects, during a time period, an in-device conflict between a service configured for the LTE PC5 interface and a service configured for the NR PC5 interface, the UE 102 may determine which of the services to support during the time period based at least partly on the information included in the signaling.

In some embodiments, the UE 102 may detect one or more synchronization signals; and determine, based on the one or more synchronization signals, a reference timing for one or more of: configure time division multiplexing (TDM) operation for the LTE PC5 interface and the NR PC5 interface; align subframe boundaries of the LTE PC5 interface and the NR PC5 interface; and/or other.

In some embodiments, the UE 102 may receive, from an eNB 104 of an LTE network or a gNB 105 of an NR network, signaling that configures the UE 102 for one or more services on an LTE PC5 interface and one or more services on an NR PC5 interface. In some embodiments, the signaling may include sidelink resource allocation information and information that includes one or more of: priorities of the services, radio-layer conditions and measurements for the NR PC5 interface or the LTE PC5 interface, status information related to a service on the NR PC5 interface or the LTE PC5 interface, and/or other. It should be noted that the signaling may not necessarily be received from just one of the eNB 104 and the gNB 105. In some embodiments, UE NR PC5 may share such signaling with UE LTE PC5 interface and vice versa. In some embodiments, the UE 102 may receive signaling from the eNB 104 that includes some or all of the above information, and the UE 102 may also receive signaling from the gNB 105 that includes some or all of the above information. In some embodiments, information related to the priorities may be included in one or more packets received as part of one or more services.

In some embodiments, if the UE 102 detects, during a time period, an in-device conflict between a service configured for the LTE PC5 interface and a service configured for the NR PC5 interface, the UE 102 may determine which of the services to support during the time period based at least partly on the information included in the signaling. The UE 102 may perform one or more of: detect one or more synchronization signals; determine, based on the one or more synchronization signals, a reference timing; and/or other. The UE 102 may use the reference timing and/or other information to perform one or more of: align subframe boundaries of the LTE PC5 interface and the NR PC5 interface; configure TDM operation for the LTE PC5 interface and the NR PC5 interface; trigger resource reselection for conflicting resources, drop transmission and/or other.

In some embodiments, the LTE sidelink communication and the NR sidelink communication may include one or more of: vehicle-to-vehicle (V2V) communication, vehicle-to-everything (V2X) communication, enhanced V2X (eV2X) communication, device-to-device (D2D) communication, and/or other.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
  a memory; and
  at least one processor in communication with the memory and configured to cause a user equipment (UE) to:
    detect one or more synchronization signals for sidelink synchronization;
    based on the one or more synchronization signals, determine a reference timing to be used for a common synchronization of Long Term Evolution (LTE) sidelink communication on an LTE PC5 interface and New Radio (NR) sidelink communication on an NR PC5 interface in accordance with time division multiplexing (TDM) operation, wherein subframe boundaries of the LTE PC5 interface and the NR PC5 interface are aligned in time;
    decode, from an Evolved Node-B (eNB) of an LTE network or a Next Generation Node-B (gNB) of an NR network, information related to priorities of:
      one or more services configured for the LTE PC5 interface, and
      one or more services configured for the NR PC5 interface; and
    if the UE detects, during a time period, an in-device conflict between a service configured for the LTE PC5 interface and a service configured for the NR PC5 interface, determine which of the services to support during the time period based on the corresponding priorities.

2. The apparatus according to claim 1,
  wherein if the in-device conflict is between a transmission on the NR PC5 interface for a first service, and a transmission on the LTE PC5 interface for a second service,
  wherein if a first priority of the first service and a second priority for the second service are available to the UE, and
  wherein if the first and second priorities are different, the at least one processor is configured to cause the UE to:
    select the service for which the corresponding priority is highest; prioritize transmission of the selected service; and
    encode one or more packets for transmission for the selected service on the corresponding PC5 interface.

3. The apparatus according to claim 2, wherein the at least one processor is further configured to:
  of the first and second services, for the service that is not selected, perform one or more of:
    postpone the corresponding transmission,
    trigger resource reselection and determine non-conflicting resources for transmission,
    drop the corresponding transmission, and
    reduce a transmit power of the corresponding transmission.

4. The apparatus according to claim 2,
  wherein if either the first priority of the first service or the second priority for the second service is not available to the UE, or
  wherein if the first and second priorities are available to the UE and the first and second priorities are the same, the at least one processor is configured to cause the UE to:
    select either the first service or the second service based on preconfigured information; or
    share TX power for transmission on both interfaces; and encode one or more packets for transmission for delivery of the selected service(s) on the corresponding PC5 interface(s).

5. The apparatus according to claim 4, wherein the preconfigured information includes channel busy ratio measured on each of the PC5 interfaces.

6. The apparatus according to claim 2, wherein the at least one processor is further configured to:
  indicate, to the eNB or the gNB, UE capability of in-device coordination on PC5 interfaces to mitigate potential conflicts between eNB and gNB implementation;
  decode first signaling that schedules the transmission on the NR PC5 interface for the first service;
  decode second signaling that schedules the transmission on the LTE PC5 interface for the second service; or
  apply in-device coordination actions if it is detected that scheduled transmissions are in conflict.

7. The apparatus according to claim 2,
wherein if the in-device conflict is between the transmission on the NR PC5 interface for the first service, and reception on the LTE PC5 interface for the second service, or
wherein if the in-device conflict is between reception on the NR PC5 interface for the first service, and the transmission on the LTE PC5 interface for the second service, the at least one processor is configured to cause the UE to:
select the service for which the corresponding priority is highest; re-select resources for service transmission if reception was prioritized; or
drop transmission if reception of the service was prioritized.

8. The apparatus according to claim 2,
wherein if the in-device conflict is between reception on the NR PC5 interface for the first service, and reception on the LTE PC5 interface for the second service, and
wherein if the processing circuitry is configured for shared processing of the reception on the NR PC5 interface and reception on the LTE PC5 interface, the at least one processor is further configured to cause the UE to:
select the service for which the corresponding priority is highest; receive one or more packets for the selected service on the corresponding PC5 interface; and
refrain from reception for the service, of the first and second services, that is not selected; and
wherein if the at least one processor is not configured for shared processing of the reception on the NR PC5 interface and reception on the LTE PC5 interface, the at least one processor is further configured to cause the UE to:
receive one or more packets for the first service on the NR PC5 interface; and
receive one or more packets for the second service on the LTE PC5 interface.

9. The apparatus according to claim 1, wherein the information related to the priorities is included in packets received as part of the services.

10. The apparatus according to claim 1, wherein the common synchronization is further in accordance with an alignment of system frame numbers (SFNs) and direct frame numbers (DFNs) for the LTE sidelink communication on the LTE PC5 interface and NR sidelink communication on the NR PC5 interface.

11. The apparatus according to claim 1, wherein the in-device conflict is based on one or more of:
leakage from a transmission for one of the services that affects transmission or reception for the other service, and
whether the UE is capable of simultaneous transmission for one of the services and reception for the other service or simultaneous transmission or reception of both services.

12. The apparatus according to claim 1,
wherein the common synchronization is further in accordance with a time alignment of resource grids for the LTE sidelink communication on the LTE PC5 interface and NR sidelink communication on the NR PC5 interface.

13. The apparatus according to claim 1, wherein the at least one processor further configured to cause the UE to:
decode, from the eNB or gNB or UE LTE PC5 or UE NR PC5 interface, additional signaling that includes one or more of:
sidelink resource allocation and radio-layer configuration settings, radio-layer conditions and measurements for the NR PC5 interface or the LTE PC5 interface, or
status information related to a delivered service on the NR PC5 interface or the LTE PC5 interface; and
determine which of the services to support during the time period based at least partly on the information included in the additional signaling.

14. The apparatus according to claim 1, wherein the at least one processor is further configured to cause the UE to:
decode, from the eNB or gNB or UE LTE PC5 or UE NR PC5 interface, additional signaling that includes inter radio access technology (inter-RAT) assistance information, including information related to one or more of:
sidelink resource configurations,
sidelink synchronization,
reserved sidelink resources, reserved time intervals, active resource reservations and semi-persistent resource allocation, or active hybrid automatic repeat request (HARD) processes with resource reservations, and
delivered service priority and resources selected for delivery (either transmission or reception); and
determine which of the services to support during the time period based at least partly on the information included in the additional signaling.

15. The apparatus according to claim 1,
wherein the time period includes one or more orthogonal frequency division multiplexing (OFDM) symbols, slots or subframes,
wherein the synchronization signals include one or more of: an LTE synchronization signal from the eNB, an NR synchronization signal from the gNB, and a sidelink synchronization signal (SLSS) from another UE or GNSS signals, and
wherein the LTE sidelink communication and the NR sidelink communication include one or more of: vehicle-to-vehicle (V2V) communication, vehicle-to-everything (V2X) communication, and enhanced V2X (eV2X) communication.

16. The apparatus of claim 1,
wherein the at least one processor includes a baseband processor to determine the reference timing, and
wherein the apparatus further comprises a transceiver to receive the signaling.

17. A computer-readable storage medium that stores instructions for execution by processing circuitry of a User Equipment (UE), the operations to configure the processing circuitry to:
decode, from an Evolved Node-B (eNB) of an LTE network or a Next Generation Node-B (gNB) of an NR network or UE LTE PC5 or UE NR PC5 interface, signaling that configures the UE for one or more services on an LTE PC5 interface and one or more services on an NR PC5 interface, wherein the signaling further includes information to configure the UE to resolve in-device conflicts between communication on the LTE PC5 interface and communication on the NR PC5 interface, wherein the information includes one or more of:
priorities of the services, sidelink resource allocation and reservation information, radio-layer conditions and measurements for the NR PC5 interface or the LTE PC5 interface, and status information related to a service on the NR PC5 interface or the LTE PC5 interface; and if the UE detects, during a time period, an in-device conflict between a service configured for the LTE PC5 interface and a service configured for the NR PC5 interface, determine which of the services to support during the time period based on the information included in the signaling.

18. The computer-readable storage medium according to claim 17, the operations to further configure the processing circuitry to:
   detect one or more synchronization signals; and
   determine, based on the one or more synchronization signals, a reference timing to:
      configure time division multiplexing (TDM) operation for the LTE PC5 interface and the NR PC5 interface, or
      align subframe boundaries of the LTE PC5 interface and the NR PC5 interface.

19. An apparatus comprising:
   a memory; and
   at least one processor in communication with the memory and configured to cause a user equipment (UE) to:
      decode, from an Evolved Node-B (eNB) of an LTE network or a Next Generation Node-B (gNB) of an NR network or UE LTE PC5 or UE NR PC5 interface, signaling that configures the UE for one or more services on an LTE PC5 interface and one or more services on an NR PC5 interface, wherein the signaling includes information that includes one or more of:
         priorities of the services,
         sidelink resource allocation and reservation information, radio-layer conditions and measurements for the NR PC5 interface or the LTE PC5 interface, and
         status information related to a service on the NR PC5 interface or the LTE PC5 interface; and
      if the UE detects, during a time period, an in-device conflict between a service configured for the LTE PC5 interface and a service configured for the NR PC5 interface, determine which of the services to support during the time period based on the information included in the signaling, and
   wherein the memory is configured to store at least a portion of the information included in the signaling.

20. The apparatus according to claim 19, wherein the at least one processor is further configured to:
   detect one or more synchronization signals; and
   determine, based on the one or more synchronization signals, a reference timing to:
      configure time division multiplexing (TDM) operation for the LTE PC5 interface and the NR PC5 interface, or
      align subframe boundaries of the LTE PC5 interface and the NR PC5 interface.

* * * * *